United States Patent
Zhang et al.

(10) Patent No.: US 12,124,231 B2
(45) Date of Patent: Oct. 22, 2024

(54) ON-BOARD MACHINE COMPONENT FAILURE DETECTION

(71) Applicant: Caterpillar Inc., Peoria, IL (US)

(72) Inventors: Yanchai Zhang, Dunlap, IL (US); Wenming Zhao, Dunlap, IL (US); Chunhui Pan, Edwards, IL (US); Daojie Zhang, Northbrook, IL (US); Xuefei Hu, Dunlap, IL (US); Shiferaw Damtie Beyene, Peoria, IL (US); Nathan J. Wieland, Eureka, IL (US); John Dewey Gates, Oswego, IL (US); Nimesh Akalanka Jayakody, Springfield, IL (US)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 17/538,324

(22) Filed: Nov. 30, 2021

(65) Prior Publication Data
US 2023/0168641 A1    Jun. 1, 2023

(51) Int. Cl.
*G05B 23/02* (2006.01)
*G05B 13/02* (2006.01)
*G05B 13/04* (2006.01)

(52) U.S. Cl.
CPC ....... *G05B 13/042* (2013.01); *G05B 13/0265* (2013.01); *G05B 23/024* (2013.01); *G05B 23/0283* (2013.01)

(58) Field of Classification Search
None
See application file for complete search history.

(56) References Cited

U.S. PATENT DOCUMENTS

| | | | |
|---|---|---|---|
| 7,764,188 B2 | 7/2010 | O'Neal et al. | |
| 2005/0267702 A1* | 12/2005 | Shah | G05B 23/0229 702/81 |
| 2009/0111520 A1* | 4/2009 | Ring | G07C 5/008 455/557 |
| 2017/0092021 A1 | 3/2017 | Nielsen et al. | |
| 2017/0243413 A1* | 8/2017 | Haggerty | G05B 23/0254 |

(Continued)

FOREIGN PATENT DOCUMENTS

| | | |
|---|---|---|
| CA | 3099659 A1 | 11/2019 |
| IN | 201741001352 A * | 7/2018 |
| WO | 2021108680 A1 | 6/2021 |

OTHER PUBLICATIONS

Written Opinion and International Search Report for Int'l. Patent Appln. No. PCT/US2022/080298, mailed Mar. 27, 2023 (10 pgs).

*Primary Examiner* — Amelia Vorce

(57) ABSTRACT

An electronic control module (ECM) on-board a machine executes a reduced-order model configured to generate virtual sensor data associated with a machine component based on sensor data measured by actual sensors. The ECM can also execute a machine learning model configured to generate offset data for the sensor data and/or the virtual sensor data, based on operating conditions, an age of the machine component, and/or other factors that the reduced-order model may not consider. The sensor data and/or the virtual sensor data, adjusted based on the offset data, can indicate whether the machine component has failed or is predicted to fail at a future point in time, and/or a remaining usable life of the machine component.

20 Claims, 4 Drawing Sheets

(56) References Cited

U.S. PATENT DOCUMENTS

| | | | |
|---|---|---|---|
| 2017/0293710 A1* | 10/2017 | Haggerty | G06F 30/17 |
| 2018/0031290 A1* | 2/2018 | Ho | B64D 13/08 |
| 2020/0118366 A1 | 4/2020 | Ryan et al. | |
| 2020/0182038 A1* | 6/2020 | Soukup | E21B 44/00 |
| 2020/0310397 A1* | 10/2020 | Hande | G06Q 10/067 |
| 2020/0311326 A1* | 10/2020 | Kochar | G06N 20/00 |
| 2021/0163021 A1 | 6/2021 | Frazzoli et al. | |
| 2021/0173390 A1 | 6/2021 | Hosek et al. | |
| 2021/0326731 A1* | 10/2021 | Nasle | G06F 30/27 |
| 2022/0042472 A1* | 2/2022 | Domingos | F01M 1/10 |
| 2022/0197231 A1* | 6/2022 | Kim | G05B 23/0254 |

\* cited by examiner

ON-BOARD MACHINE COMPONENT FAILURE DETECTION

TECHNICAL FIELD

The present disclosure relates to detecting and predicting failures of machine components and, more particularly, to detecting and predicting failures of machine components on-board a machine using a reduced-order model and a machine learning model.

BACKGROUND

Vehicles and other machines can include various types of components, such as driveshafts, axles, engines, and other components. Such components can be at risk of failing over time, for instance as components age, fatigue, experience wear and tear, or are used beyond operating limits. As an example, joints and other components of a driveshaft can be at risk of experiencing structural failures such as fractures, galling, spalling, brinelling, pitting, and burning.

Various systems have been developed to monitor conditions of vehicles and other machines, such that component replacement and/or other preventative maintenance can be performed before failures occur. For example, U.S. Patent Application Pub. No. 2017/0092021 to Nielsen et al. (hereinafter "Nielsen") describes using principal component analysis (PCA) to convert vehicle acceleration parameters and/or other vehicle parameters into eigenvectors that are used to form a multi-dimensional model, such as an ellipsoid. The multi-dimensional model generated from such vehicle parameters can be compared against a reference model of normal vehicle behavior. An abnormal condition of the vehicle can be detected if the volume of the generated three-dimensional model is greater than the volume of the reference model of the vehicle, or if lengths of one or more eigenvectors of the generated three-dimensional model differ from lengths of corresponding eigenvectors in the reference model.

However, although the PCA analysis described by Nielsen can reveal an abnormal condition of a vehicle overall, more investigation may be needed to determine which specific components of the vehicle are causing that abnormal condition. Accordingly, the system described by Nielsen may not directly indicate failures, or predicted failures, of specific components of a machine.

The example systems and methods described herein are directed toward overcoming one or more of the deficiencies described above.

SUMMARY OF THE INVENTION

According to a first aspect, a method includes receiving, by an electronic control module (ECM) on-board a machine, and from one or more sensors on-board the machine, sensor data associated with a machine component of the machine. The method also includes generating, by a reduced-order model executing on the ECM, virtual sensor data corresponding to the sensor data. The method further includes generating, by a machine learning model executing on the ECM, offset data based on one or more of the sensor data, the age of the machine component, or operating conditions of the machine. The offset data indicates adjustments to at least one of the sensor data or the virtual sensor data. The method additionally includes generating, by a condition monitor executing on the ECM, failure data associated with the machine component. The condition monitor generates the failure data by adjusting the at least one of the sensor data or the virtual sensor data based on the offset data, and comparing the at least one of the sensor data or the virtual sensor data against a failure condition threshold of a fail we condition associated with the machine component. The failure data indicates at least one of an indication that the machine component has failed, or a predicted remaining usable life of the machine component.

According to a further aspect, an ECM associated with a machine includes one or more processors and memory storing computer-executable instructions. The memory storing computer-executable instructions, when executed by the one or more processors, cause the one or more processors to perform operations. The operations include receiving, from one or more sensors on-board the machine, sensor data associated with a machine component of the machine. The operations also include generating, using a reduced-order model, virtual sensor data corresponding to the sensor data. The operations further include generating, using a machine learning model, offset data based on one or more of the sensor data, an age of the machine component, or operating conditions of the machine. The offset data indicates adjustments to at least one of the sensor data or the virtual sensor data. The operations additionally include generating failure data associated with the machine component by adjusting the at least one of the sensor data or the virtual sensor data based on the offset data, and comparing the at least one of the sensor data or the virtual sensor data against a failure condition threshold of a failure condition associated with the machine component. The failure data indicates at least one of an indication that the machine component has failed, or a predicted remaining usable life of the machine component.

According to another aspect, a machine includes a machine component, one or more sensors associated with the machine component, and an ECM associated with the machine component. The ECM is configured to receive, from the one or more sensors, sensor data associated with the machine component. The ECM is also configured to generate, using a reduced-order model, virtual sensor data corresponding to the sensor data. The ECM is further configured to generate, using a machine learning model, offset data based on one or more of the sensor data, an age of the machine component, or operating conditions of the machine. The offset data indicates adjustments to at least one of the sensor data or the virtual sensor data. The ECM is additionally configured to generate failure data associated with the machine component by adjusting the at least one of the sensor data or the virtual sensor data based on the offset data, and comparing the at least one of the sensor data or the virtual sensor data against a failure condition threshold of a failure condition associated with the machine component. The failure data indicates at least one of an indication that the machine component has failed, or a predicted remaining usable life of the machine component.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
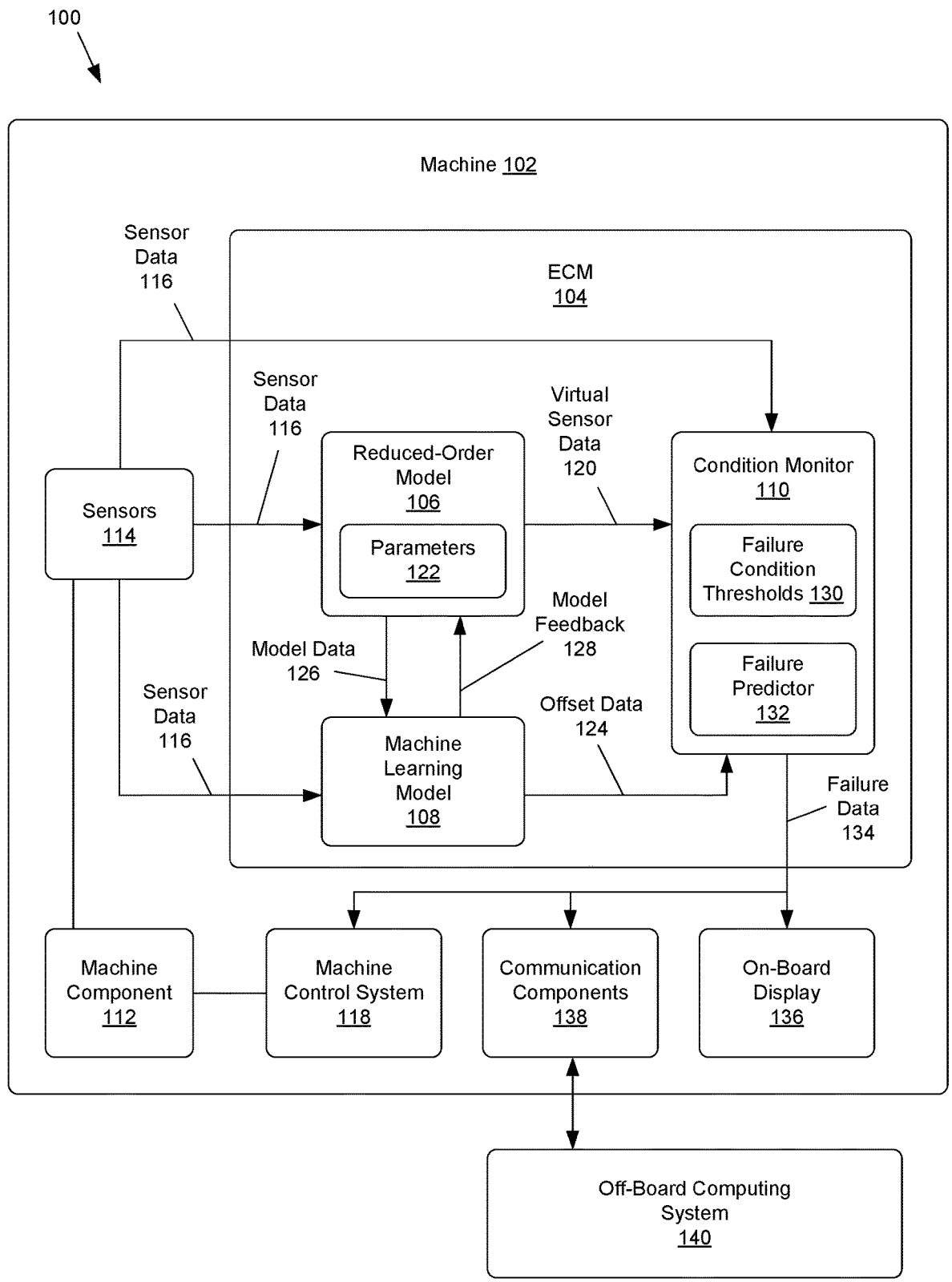
FIG. 1 shows an example of a machine that has an on-board electronic control module configured to execute a reduced-order model, a machine learning model, and a condition monitor associated with a machine component.

FIG. 1 shows an example 100 of a machine 102 that has an on-board electronic control module (ECM) 104. The ECM 104 can be configured to execute a reduced-order model 106, a machine learning model 108, and a condition monitor 110 associated with a machine component 112 of the machine 102. One or more sensors 114 associated with the machine component 112 can provide sensor data 116 to the reduced-order model 106, the machine learning model 108, and the condition monitor 110. The condition monitor 110 can be configured to use the sensor data 116 and additional data, generated by the reduced-order model 106 and the machine learning model 108 based on the sensor data 116, to determine if the machine component 112 has failed, or to predict a future failure and/or remaining usable life of the machine component 112.

The machine 102 can be a vehicle, a piece of heavy machinery, a piece of industrial equipment, or any other type of machine. For example, the machine 102 can be a commercial or work machine, such as a mining vehicle, earthmoving vehicle, backhoe, excavator, scraper, dozer, crusher, loader (e.g., large wheel loader, track-type loader, etc.), shovel, truck (e.g., mining truck, haul truck, on-highway truck, off-highway truck, articulated truck, tanker, etc.), a crane, a pipe layer, a paver, a compactor, a tractor, farming equipment, or any other type of mobile machine, stationary machine, or portable machine.

In some examples, the machine 102 can be configured to perform work operations on a worksite and/or at other locations. For example, the machine 102 can operate at, and/or travel around, a mine site, a quarry, a construction site, or any other type of worksite or work environment. In some examples, the machine 102 can have one or more work tools, such as a bucket, scraper, ripper, blade, pusher, fork, grapple, plow, haul bed, or other type of work tool. In these examples, the machine 102 can be configured to move and/or use one or more types of work tools to interact with rocks, gravel, dirt, sand, lumber, construction material, and/or any other type of material on a worksite. As an example, the machine 102 can be a haul truck that uses a haul bed to move material around a worksite and/or to other locations.

The machine 102 can be a staffed machine, a semi-autonomous machine, or an autonomous machine. In examples in which the machine 102 is a staffed machine or a semi-autonomous machine, a human operator or driver can operate, control, or direct some or all of the functions of the machine 102. However, in examples in which the machine 102 is autonomous or semi-autonomous, functions of the machine 102, such as steering, speed adjustments, work tool positioning and movement, and/or other functions can be fully or partially controlled, automatically or semi-automatically, by on-board and/or off-board controllers or other computing devices associated with the machine 102. For instance, the machine 102 can have a machine control system 118 that is configured to, automatically or semi-automatically, control movements and/or other operations of the machine component 112 and/or other components of the machine 102. In some examples, the machine control system 118 can include one or more other ECMs or other computing systems separate from the ECM 104. In other examples, the ECM 104 can be an element of the machine control system 118.

The machine component 112 can be a component, system, subsystem, or other element of the machine 102. For example, the machine component 112 can be a driveshaft, an axle, a universal joint (U-joint), an engine component, a transmission component, a hydraulic component, a component of a work tool, or any other component of the machine 102.

The machine component 112 can be at risk of failing over time and/or during operations of the machine 102. For instance, if the machine component 112 is a U-joint of a driveshaft, the U-joint may be at risk of experiencing fractures, galling, spalling, brinelling, pitting, burning, and/or other types of structural failures. However, as described herein, the condition monitor 110 can be configured to determine whether the machine component 112 has failed, and/or predict when the machine component 112 is likely to fail, such that the condition monitor 110 can determine a remaining usable life of the machine component 112.

The sensors 114 can be configured to measure and/or determine sensor data 116 associated with the machine component 112 and/or other components of the machine 102. The sensors 114 can include one or more types of sensors, such as vibration sensors, torque sensors, engine speed sensors, wheel speed sensors, other speed sensors, inertial measurement units (IMUs), electrical current sensors, strain sensors, brake sensors, payload sensors, weight sensors, temperature sensors, tire pressure sensors, sensors indicating operator commands for brakes, gears, and other components, and/or other types of sensors. As a non-limiting example, the sensors 114 can include one or more vibration sensors, such as piezoelectric accelerometer sensors, configured to measure vibration of the machine component 112 and/or other elements of the machine 102. As another non-limiting example, the sensors 114 can include a speed sensor configured to configured to measure and output a rotational speed indicating how quickly a driveshaft is rotating.

The sensors 114 can provide sensor data 116, such as vibration data, torque data, speed data, braking commands or other brake data, gear selections, temperature data, solenoid current data, IMU data, strain data, weight data, and/or any other type of data measured or determined by the sensors 114, to the ECM 104 for use by the reduced-order model 106 and the machine learning model 108. For example, the sensors 114 can provide sensor data 116 to the ECM 104 through wired and/or wireless data connections. As discussed further below, in some examples one or more types of sensor data 116 can be high-frequency data, such measurements captured hundreds or thousands per second, or at any other high frequency or sample rate. As a non-limiting example, a vibration sensor associated with the machine component 112 can provide vibration data captured at 1000 Hz, or any other high frequency.

Figure 4:
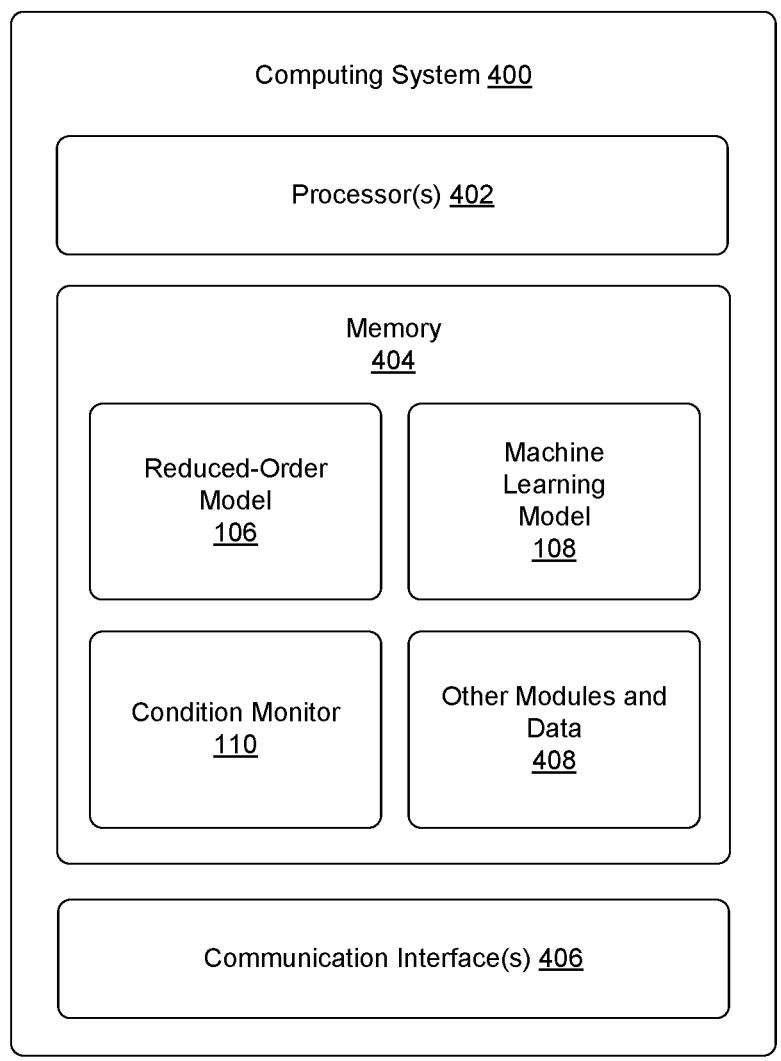
FIG. 4 shows an example system architecture for a computing system associated with the machine.

The ECM 104 is a computing system that is on-board the machine 102. An example architecture of a computing system associated with the ECM 104 is shown in FIG. 4, and is described below with respect to that figure. In some examples, the ECM 104 can be integrated into the machine 102 and can be dedicated to monitoring the machine component 112. In other examples, the ECM 104 can be an element of the machine control system 118 that is configured to control operations of the machine component 112 and/or other elements of the machine 102. In still other examples, the ECM 104 can be an aftermarket component that can be connected to the machine 102 and be configured to receive sensor data 116, such that the aftermarket ECM 104 can execute the reduced-order model 106, the machine learning model 108, and the condition monitor 110 to monitor the machine component 112.

The reduced-order model 106 can be a physics-based model of the machine component 112. The reduced-order model 106 can be configured to simulate movements, operations, and/or other attributes of the machine component 112 based on sensor data 116 associated with the machine component 112 and/or other components of the machine 102. The reduced-order model 106 can, for example, generate virtual sensor data 120 associated with the machine component 112 based on sensor data 116 provided by one or more sensors 114. The reduced-order model 106 can also provide the virtual sensor data 120 to the condition monitor 110.

In some examples, the virtual sensor data 120 can be inferred or derived sensor data 116 associated with positions on the machine component 112 and/or other elements of the machine 102 that may not be possible or practical to measure directly with sensors 114. As a non-limiting example, there may not be space to attach a vibration sensor to a particular position on a U-joint that may be at risk of failing. However, one or more vibration sensors may be attached to other positions on the U-joint, such that those vibration sensors can provide corresponding vibration data to the reduced-order model 106. The reduced-order model 106 can be configured to use the vibration data actually measured by the vibration sensors, and/or other types of sensor data 116 provided by other types of sensors 114, to derive or infer corresponding vibration data that would have been measured at the particular position on the U-joint if a vibration sensor could have been attached at that particular position.

In other examples, the virtual sensor data 120 can be, or include, different types of data than the received sensor data 116. For example, the reduced-order model 106 can be configured to derive stress or strain data, torsional loads, linear loads, pressure measurements, payload information, and/or other types of data based on sensor data 116 that do not directly indicate those types of data.

The reduced-order model 106 can be based on a high-fidelity physics-based model of the machine component 112 that is configured to execute on one or more off-board computing systems. For example, the high-fidelity physics-based model of the machine component 112 can be a computer-aided engineering (CAE) model of the machine component 112 used during simulations of the machine component 112 performed on off-board computing systems that may, in some examples, have more computing resources than the ECM 104.

The reduced-order model 106 can be configured to substantially emulate the high-fidelity physics-based model through model order reduction techniques such as proper orthogonal decomposition methods, proper generalized decomposition, reduced basis methods, balancing methods, simplified physics, and/or other model order reduction techniques. For example, the reduced-order model 106 can include parameters 122 for one or more simplified equations derived from the high-fidelity physics-based model. The parameters 122 can, for example, be coefficients for values in one or more equations used in the reduced-order model 106.

The reduced-order model 106 can be configured to be executed more quickly and/or with fewer computing resources than the high-fidelity physics-based model. For example, although the ECM 104 may, in some examples, have fewer computing resources than other off-board computing systems that are configured to execute the high-fidelity physics-based model of the machine component 112, the ECM 104 on-board the machine 102 can execute the reduced-order model 106 of the machine component 112 using the processing power, memory, and other computing resources of the on-board ECM 104.

As another example, off-board computing systems may execute the high-fidelity physics-based model to perform simulations of the machine component 112 over seconds, minutes, or other longer periods of time. However, the reduced-order model 106 can be configured to be executed, by the ECM 104, substantially in real-time. For instance, the reduced-order model 106 can generate virtual sensor data 120 corresponding to received sensor data 116 substantially in real-time, for instance within milliseconds after receiving the sensor data 116 from sensors 114. In these examples, the reduced-order model 106 can simulate the machine component 112 to generate virtual sensor data 120 substantially in real-time on board the machine 102, more quickly than the high-fidelity physics-based model could produce similar data.

The reduced-order model 106 can be a relatively static model derived from the high-fidelity physics model. For example, the reduced-order model 106 derived from the high-fidelity physics model can be configured to simulate a new or optimal instance of the machine component 112, and/or may be designed to simulate the machine component 112 under optimal or static operating conditions. Accordingly, the reduced-order model 106 may not be designed to dynamically account for changes to the age of the machine component 112 over time, changes to operating conditions of the machine 102 over time, and/or other changing factors.

However, the machine learning model 108 can be configured to generate offset data 124 that does dynamically account for changes to the age of the machine component 112 over time, changes to operating conditions of the machine 102 over time, and/or other changing factors. For example, the offset data 124 can indicate adjustments to the sensor data 116 received from the sensors 114, and/or adjustments to the virtual sensor data 120 generated by the reduced-order model 106, based on ages of the machine component 112 and/or other components of the machine 102, operating conditions of the machine 102, and/or other factors that may not be accounted for in the reduced-order model 106.

Accordingly, the combination of the reduced-order model 106 and the machine learning model 108 can serve as a digital twin of the machine component 112 that can execute on board the machine 102 using the computing resources of the ECM 104, and/or can execute more quickly than the high-fidelity physics model. Although the reduced-order model 106 may not be designed to account for changing factors, the machine learning model 108 allows the digital twin of the machine component 112 to adapt, over time, based on changing factors such as the age of the machine component 112, operating conditions of the machine 102, and/or other factors. The digital twin can also execute, on board the machine 102, based on a continuous or persistent stream of sensor data 116, such that the on-board condition monitor 110 can use corresponding data generated by the digital twin to continually or periodically determine if the machine component 112 has failed, or to predict a future failure and/or remaining usable life of the machine component 112.

The machine learning model 108 can be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning framework. The machine learning model 108 can be trained using a supervised or unsupervised machine learning approach, for instance based on a training data set.

The training data set can include sensor data 116 collected based on operations of similar machines and machine components over time. For example, the training data set can be associated with a set of machines that include instances of the machine component 112 of varying ages. The training data set may also be collected during operations of machines during different temperature conditions, other different environmental conditions, during interactions of the machines with varying types and/or weights of materials or payloads, during operations of the machines at differing power levels, during operations of the machines at differing engine speeds, and/or during operations of the machines associated with different values for any other variable.

The training data set may indicate that one or more types of sensor data 116 change based on an age of the machine component 112, based on operating conditions, and/or other factors. For example, the training data set may indicate that certain positions on older instances of the machine component 112 experience more vibrations than those same positions on newer instances of the machine component 112 during similar operating conditions. As another example, the training data set may indicate that instances of the machine component 112 experience higher strain or load levels during certain operating conditions than during other operating conditions.

Some data points in the collected training data set can be designated as "features" for the machine learning model 108, while other measured data indicative of corresponding offset values based on ages of machine components, operating conditions, and/or other factors can be designated as "labels" to be predicted by the machine learning model 108. Machine learning algorithms, such as supervised machine learning algorithms, can operate on the training data set to determine which features in input sensor data 116 and/or virtual sensor data 120 can be used to predict corresponding offset values, determine weights for those features and/or combinations of features, and/or otherwise determine how values in the input sensor data 116 and/or virtual sensor data 120 correspond to the offset values. Accordingly, after the machine learning model 108 has been trained on the training set of historical data, the trained machine learning model 108 can be used to predict offset data 124 based on new sensor data 116 and/or virtual sensor data 120. In some examples, the machine learning model 108 can be trained on one or more off-board computing systems, and a trained instance of the machine learning model 108 can be provided for execution by the on-board ECM 104. Off-board computing systems can also continue to train the machine learning model 108 over time based on new or updated training data, such that updated versions of the machine learning model 108 can be provided to the on-board ECM 104 via wired or wireless data transfers.

The machine learning model 108 can accordingly be trained on the training data set to determine offset data 124 associated with received sensor data 116 and/or virtual sensor data 120 generated by the reduced-order model 106. As a non-limiting example, although received sensor data 116 may indicate a particular vibration amplitude associated with a position on the machine component 112, the machine learning model 108 may determine that vibration amplitudes indicated in virtual sensor data 120 for other positions on the machine component 112 should be increased by 5%, or another offset value, due to a current age of the machine component 112. Accordingly, the machine learning model 108 can provide offset data 124, indicating offset values associated with one or more types of virtual sensor data 120, to the condition monitor 110.

The machine learning model 108 can receive model data 126 from the reduced-order model 106. The model data 126 can indicate current values of the parameters 122, virtual sensor data 120 generated by the reduced-order model 106, and/or other information associated with the reduced-order model 106.

In some examples, the machine learning model 108 can use virtual sensor data 120 indicated in the model data 126 to determine corresponding offset data 124 that adjusts the virtual sensor data 120 indicated in the model data 126. For example, if the model data 126 indicates that the reduced-order model 106 is providing particular values for one or more types of virtual sensor data 120 to the condition monitor 110, the machine learning model 108 can use other sensor data 116 received from the sensors 114 to determine operating conditions of the machine 102, and whether, and/or how, individual values for the virtual sensor data 120 should be adjusted based on the operating conditions. As another example, if the model data 126 indicates that the reduced-order model 106 is providing particular values for one or more types of virtual sensor data 120 to the condition monitor 110, the machine learning model 108 can use an age of the machine component 112 to determine whether, and/or how, individual values for the virtual sensor data 120 should be adjusted based on the age of the machine component 112. The machine learning model 108 can accordingly generate offset data 124 associated with the virtual sensor data 120, and provide the offset data 124 to the condition monitor 110. The condition monitor 110 can use the offset data 124, provided by the machine learning model 108, to adjust virtual sensor data 120 received from the reduced-order model 106.

In other examples, the machine learning model 108 can use the model data 126 to determine adjustments to one or more of the parameters 122 used in the reduced-order model 106. The machine learning model 108 can include updated values of one or more parameters 122 in model feedback 128 provided to the reduced-order model 106. The adjusted values of the parameters 122 can be based on the age of the machine component 112, current operating conditions of the machine 102 indicated by sensor data 116, and/or other factors. Accordingly, the reduced-order model 106 can determine virtual sensor data 120 based at least in part on the parameters 122 that have been adjusted based on the age of the machine component 112, operating conditions of the machine 102, and/or other factors, and thereby improve accuracy of the virtual sensor data 120.

For example, the model data 126 can indicate that current values of the parameters 122 are causing the reduced-order model 106 to determine values for virtual sensor data 120 that the machine learning model 108 determines should be adjusted up or down according to the offset data 124 based on the current age of the machine component 112, operating conditions of the machine, and/or other factors. The machine learning model 108 can determine adjusted values of the parameters 122, which the machine learning model 108 predicts will cause the reduced-order model 106 to determine more accurate values for the virtual sensor data 120.

The machine learning model 108 can accordingly use the model feedback 128 to indicate the adjusted values of the parameters 122, such that the reduced-order model 106 can use the adjusted values of the parameters 122 to generate subsequent virtual sensor data 120 that may be more accurate.

In some examples, because adjusted parameters 122 indicated in the model feedback 128 can cause the virtual sensor data 120 generated by the reduced-order model 106 to be more accurate, and/or to already be adjusted according to offset data 124 the machine learning model 108 would otherwise produce, the machine learning model 108 can avoid providing corresponding offset data 124 to the condition monitor 110. However, in other examples, the machine learning model 108 can provide offset data 124 to the condition monitor 110 that further adjusts the virtual sensor data 120 produced by the reduced-order model 106 using the adjusted parameters 122, and/or can provide offset data 124 to the condition monitor 110 that is associated with one or more other types of virtual sensor data 120 generated based on non-adjusted parameters 122.

The condition monitor 110 can be configured to receive sensor data 116 from the sensors 114, virtual sensor data 120 from the reduced-order model 106, and/or offset data 124 from the machine learning model 108. If the condition monitor 110 receives offset data 124 from the machine learning model 108 that is associated with any of the virtual sensor data 120 received from the reduced-order model 106, the condition monitor 110 can adjust the received virtual sensor data 120 based on the received offset data 124. In some examples, if the offset data 124 is associated with sensor data 116 provided directly by the sensors 114, the condition monitor 110 can also adjust the received sensor data 116 based on the offset data 124.

The condition monitor 110 can also be configured with failure condition thresholds 130 associated with one or more types of sensor data 116, one or more types of virtual sensor data 120, or combinations of one or more types of sensor data 116 and/or one or more types of virtual sensor data 120. For example, one of the failure condition thresholds 130 can associated with data that can be derived by the condition monitor 110 based on a combination of types of sensor data 116 and virtual sensor data 120.

The failure condition thresholds 130 can be predefined minimum values, maximum values, or ranges of values that are indicative of failure conditions in which the machine component 112 has failed, or is likely to fail. The condition monitor 110 can compare the sensor data 116, the virtual sensor data 120, and/or combinations of the sensor data 116 and the virtual sensor data 120, in some examples adjusted according to the offset data 124, against one or more of the failure condition thresholds 130 to determine if the sensor data 116, the virtual sensor data 120, and/or combinations of the sensor data 116 and the virtual sensor data 120 satisfies failure condition thresholds 130 associated with one or more failure conditions. As an example, the failure condition thresholds 130 can indicate that the machine component 112 has likely failed if vibration values in the sensor data 116 and/or virtual sensor data 120 exceed predefined values associated with a failure condition. In some examples, the failure condition thresholds 130 can be based on multiple types of data, such as a threshold vibration value, a threshold torque value, a threshold temperature value, and/or other threshold values. Accordingly, if a combination of the sensor data 116 and/or the virtual sensor data 120, or other data derived by the condition monitor from the sensor data 116 and/or the virtual sensor data 120, in some examples adjusted according to the offset data 124, satisfies one or more failure condition thresholds 130 associated with one or more failure conditions, the condition monitor 110 can determine that the machine component 112 has failed.

In some examples, the condition monitor 110 can be configured with failure condition thresholds 130 for failure conditions of different severities. For example, the condition monitor 110 can have a first failure condition threshold associated with relatively minor damage to the machine component 112, a second failure condition threshold associated with more significant damage to the machine component 112, and a third failure condition threshold associated with catastrophic damage to the machine component 112 that may prevent the machine component 112 from being used or that may put other components of the machine 102 at risk.

One or more failure condition thresholds 130, in some examples, can also be associated with timer conditions or accumulated error values with hysteresis bands. For instance, the condition monitor 110 can determine that the machine component 112 is associated with a failure condition if one or more types of sensor data 116, the virtual sensor data 120, or combinations of sensor data 116 and virtual sensor data 120 satisfies a corresponding failure condition threshold for at least a threshold period of time, or is above or below a hysteresis band associated with the failure condition threshold.

The condition monitor 110 can also have a failure predictor 132. The failure predictor 132 can be configured to predict when the machine component 112 is projected to reach a failure condition associated with a failure condition threshold, and/or to determine a remaining usable life of the machine component 112. The failure predictor 132 can be based on a rules-based model or a separate machine learning model. As an example, if sensor data 116 and/or the virtual sensor data 120, in some examples adjusted according to the offset data 124, does not meet a failure condition threshold, the condition monitor 110 can determine that the machine component 112 has not yet reached a failure condition associated with that failure condition threshold. However, although the machine component 112 may not have failed yet, the condition monitor 110 can determine that values in the sensor data 116 and/or the virtual sensor data 120 are trending closer to satisfying the failure condition threshold over time. Accordingly, the failure predictor 132 can project when the sensor data 116 and/or the virtual sensor data 120 will satisfy the failure condition threshold, and thereby predict when the machine component 112 is likely to fail. The failure predictor 132 can also be configured to continually or periodically determine the remaining usable life of the machine component 112, for instance based on the sensor data 116 and/or the virtual sensor data 120, or a prediction generated by the failure predictor 132 based on the sensor data 116 and/or the virtual sensor data 120 that indicates when the machine component 112 is likely to reach a failure condition.

The condition monitor 110 can generate failure data 134 based on the analysis of the sensor data 116, the virtual sensor data 120, and/or the offset data 124 discussed above. In some examples, the failure data 134 can indicate that the machine component 112 has reached a failure condition. In other examples, the failure data 134 can indicate that the machine component 112 is projected to reach a failure condition at a certain point in time, and/or indicate a corresponding remaining usable life of the machine component 112.

As described above, the ECM 104 on-board the machine 102 can execute the reduced-order model 106, the machine learning model 108, and the condition monitor 110 based at least in part on sensor data 116 received from the sensors 114. In some examples, one or more types of sensor data 116 may be high-frequency data that includes measurements captured at a high frequency or sample rate, such as hundreds or thousands or measurements per second. The reduced-order model 106, the machine learning model 108, and/or the condition monitor 110 can, in some examples, operate based on higher-frequency sensor data 116 than could be provided to off-board systems that execute the high-fidelity physics-based model of the machine component 112 or other models, as the sensor data 116 may otherwise have to be down-sampled or averaged to lower the amount of data transmitted to such off-board systems. Accordingly, because the reduced-order model 106, the machine learning model 108, and the condition monitor 110 can execute on-board the machine 102 based on higher-frequency sensor data 116 than off-board systems might otherwise receive, accuracy of the failure data 134 produced by the ECM 104 using the reduced-order model 106, the machine learning model 108, and the condition monitor 110 can be improved.

In some examples, the ECM 104 can provide the failure data 134 generated by the condition monitor 110 to an on-board display 136 of the machine 102. The on-board display 136 of the machine 102 can include one or more screens, indicator lights, dashboard indicators, and/or other user-perceptible elements. The on-board display 136 can present the failure data 134, and/or corresponding alerts or notifications, to an operator of the machine 102. For example, if the condition monitor 110 determines that the machine component 112 has reached a failure condition, the condition monitor 110 can generate failure data 134 that causes the on-board display 136 to display an alert indicating that the machine component 112 has reached the failure condition. Accordingly, an operator of the machine 102 may determine, based on the alert, that the machine 102 should be serviced to repair or replace the machine component 112, and/or may avoid further operations of the machine 102 that may cause further damage to the machine component 112 or other components of the machine 102.

As another example, if the condition monitor 110 determines that the machine component 112 is predicted to reach a failure condition at a future time, the condition monitor 110 can generate failure data 134 that causes the on-board display 136 to display a notification indicating when the machine component 112 is predicted to fail, and/or a corresponding remaining usable life of the machine component 112. Accordingly, an operator of the machine 102 may determine, based on the notification, that the machine 102 can continue to be used for a period of time, but can plan ahead for a maintenance operation to repair or replace the machine component 112 before the end of the remaining usable life of the machine component 112.

In some examples, the condition monitor 110 can also, or alternately, provide the failure data 134 to communication components 138 of the machine 102, such that the communication components 138 can transmit the failure data 134 to an off-board computing system 140. The communication components 138 of the machine 102 can include modems, receivers, transmitters, antennas, and/or other hardware or software elements configured to wirelessly send and receive data wireless communication interfaces. For example, the communication components 138 can include cellular interfaces, WiFi® interfaces, Bluetooth® interfaces, machine-to-machine data interfaces, and/or other types of wireless communication interfaces.

The off-board computing system 140 can be configured to log and/or analyze the failure data 134. For example, the off-board computing system 140 can be a fleet management system that can receive failure data 134 to determine when the machine 102 and/or other machines should cease operations due to failed machine components, and/or to schedule maintenance operations before machine components fail. In some examples, the off-board computing system 140 can be configured with a dashboard through which users can view the failure data 134 and/or summaries of failure data 134, and/or be configured with analytics systems that analyze the failure data 134 to determine trends, metrics, and/or other information associated with the failure data 134.

In some examples, the condition monitor 110 can also, or alternately, provide the failure data 134 to the machine control system 118 that is configured to at least partially control operations of the machine component 112 and/or other components of the machine 102. For example, if the condition monitor 110 determines that the machine component 112 has reached a failure condition, or is about to reach a failure condition, the condition monitor 110 can generate failure data 134 that cause the machine control system 118 to stop or alter use of the machine component 112 to avoid further damage to the machine component 112 or other components of the machine 102.

The condition monitor 110 can accordingly provide failure data to one or more of the on-board display 136, the off-board computing system 140 via the communication components 138, or the machine control system 118. In some examples, the condition monitor 110 can be configured to provide the failure data to different destinations based on a severity level of a failure condition. As a non-limiting example, if the condition monitor 110 determines, based on the sensor data 116, the virtual sensor data 120, and/or the offset data 124, that the machine component 112 has reached a low-severity failure condition, the condition monitor 110 may cause the on-board display 136 to present an alert to an operator of the machine 102. In this example, the machine component 112 may have experienced a low-severity structural failure, but the machine component 112 may still be usable without interrupting primary operations of the machine 102 or risking damage to other components of the machine 102. However, if the condition monitor 110 determines that the machine component 112 has reached a higher-severity failure condition that may lead to a catastrophic failure of the machine component 112 and/or risk damaging other components of the machine 102 if use of the machine component 112 continues, the condition monitor 110 can cause the on-board display 136 to present an alert and also cause the machine control system 118 to stop or adjust use of the machine component 112.

In some examples, the machine 102 can have different ECMs associated with different machine components. For example, the machine 102 can have a first ECM configured to generate failure data 134 associated with an axle, and a second ECM configured to generate failure data 134 associated with a U-joint. Each of the ECMs can have a different reduced-order model, machine learning model, and/or condition monitor associated with a corresponding machine component. In other examples, the ECM 104 can execute different reduced-order models, machine learning models, and/or condition monitors associated with different machine components.

Overall, the ECM 104 can use sensor data 116 received from sensors 114 to execute the reduced-order model 106, the machine learning model 108, and the condition monitor 110 to generate failure data 134 associated with the machine component 112 on-board the machine 102. The reduced-order model 106 can be derived from a high-fidelity physics model of the machine component 112, and be configured to generate virtual sensor data 120 that can be analyzed by the condition monitor 110 in addition to, or instead of, the sensor data 116. Because the reduced-order model 106 can be a substantially static model, derived from a high-fidelity physics model of the machine component 112, that may not consider an age of the machine component 112, operating conditions associated with the machine 102, and/or other factors, the machine learning model 108 can be trained to generate offset data 124 that the condition monitor 110 can use to adjust the virtual sensor data 120 based on the age of the machine component 112, operating conditions associated with the machine 102, and/or other factors. In some examples, the offset data 124 can also be used to adjust the sensor data 116. Accordingly, the offset data 124 generated by the machine learning model 108 can cause the sensor data 116 and/or the virtual sensor data 120 considered by the condition monitor 110 to be more accurate, and thereby cause the condition monitor 110 to more accurately determine if the machine component 112 has failed, or more accurately predict a future failure and/or a remaining usable life of the machine component 112.

Figure 2:
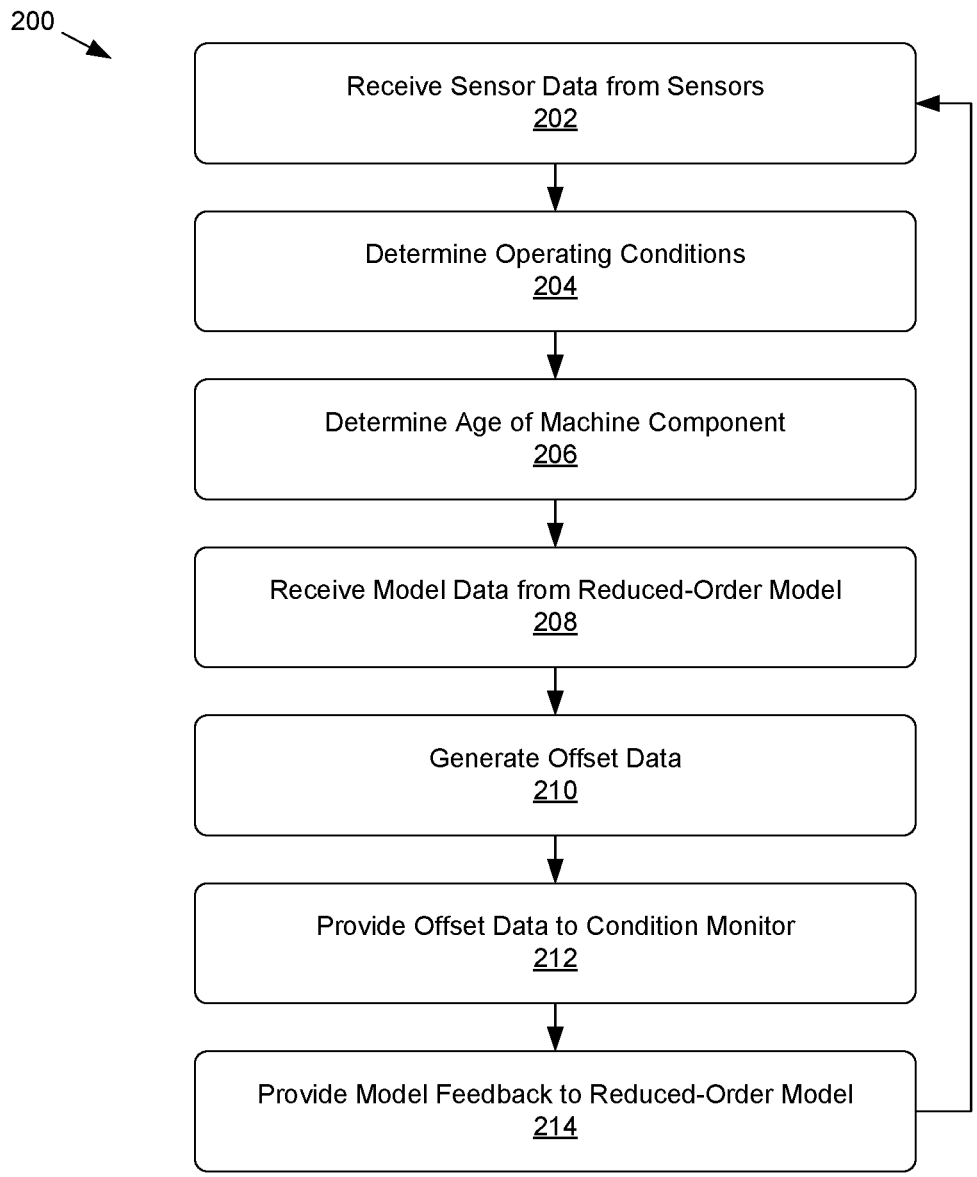
FIG. 2 shows a flowchart illustrating an example process for generating offset data with the machine learning model.

FIG. 2 shows a flowchart 200 illustrating an example process for generating the offset data 124 with the machine learning model 108. The operations shown in FIG. 2 can be performed by the machine learning model 108 executed by the ECM 104 on-board the machine 102. An example architecture of a computing system associated with the ECM 104 is shown in FIG. 4, and is described below with respect to that figure.

At block 202, the machine learning model 108 can receive sensor data 116 from sensors 114. The sensor data 116 can be associated with the machine component 112 and/or other components of the machine 102. As described above, the sensor data 116 can include vibration data, torque data, speed data, braking commands or other brake data, gear selections, temperature data, solenoid current data, IMU data, strain data, weight data, and/or any other type of data measured or determined by the sensors 114.

At block 204, the machine learning model 108 can determine operating conditions of the machine component 112, and/or the machine 102 overall, based on the sensor data 116 received at block 202. For example, the machine learning model 108 can use payload data, temperature data, engine speed data, and/or other data to determine environmental conditions that the machine 102 is operating in, types of work operations that the machine 102 is performing, and/or other types of operating conditions.

At block 206, the machine learning model 108 can determine an age of the machine component 112. In some examples, the age of the machine component 112 can be provided, in the sensor data 116, by a sensor or other element that tracks when the machine component 112 was installed in the machine 102. In other examples, the machine learning model 108 can be configured with an initial value of an age of the machine component 112, and the machine learning model 108 can increment the age value over time to track the aging of the machine component 112.

At block 208, the machine learning model 108 can receive model data 126 from the reduced-order model 106. The model data 126 can indicate current values of the parameters 122 used by the reduced-order model 106. The model data 126 can also, or alternately, indicate virtual sensor data 120 generated by the reduced-order model 106 based on the sensor data 116 received by the machine learning model 108 at block 202.

At block 210, the machine learning model 108 can generate offset data 124 for the sensor data 116 and/or the virtual sensor data 120 based at least in part on the operating conditions determined at block 204, and/or the age of the machine component 112 determined at block 206. As discussed above, the machine learning model 108 can be trained to predict offset data 124 based on a training data set captured during operations of similar machines during different operating conditions and/or based on operations of similar machine components of varying ages. Accordingly, the trained machine learning model 108 can predict, based on current operating conditions and the current age of the machine component 112, offsets for the sensor data 116 received from the sensors 114 and/or the virtual sensor data 120 received from the reduced-order model 106. The machine learning model 108 can generate the offset data 124 based on the predicted offsets.

At block 212, the machine learning model 108 can provide the offset data 124 to the condition monitor 110. Accordingly, the condition monitor 110 can use the offset data 124 to adjust sensor data 116 the condition monitor 110 receives from sensors and/or to adjust virtual sensor data 120 the condition monitor 110 receives from the reduced-order model 106.

In some examples, the machine learning model 108 can also, or alternately, provide model feedback 128 based on the offset data 124 to the reduced-order model 106 at block 214. The model feedback 128 can be new or adjusted values of the parameters 122 used by the reduced-order model 106, which the machine learning model 108 predicts will cause the reduced-order model 106 to generate subsequent virtual sensor data 120 that is equal to, or is closer to, adjusted virtual sensor data 120 the condition monitor 110 would otherwise generate by adjusting virtual sensor data 120 according to offset data 124 provided by the machine learning model 108. Accordingly, by adjusting the parameters 122 used by the reduced-order model 106 at block 214, the reduced-order model 106 can be dynamically altered based on the current operating conditions determined at block 204 and/or the age of the machine component determined at block 204, such that the machine learning model 108 may determine that less extensive offset data 124, or no offset data 124, should be used to adjust subsequent virtual sensor data 120 generated by the reduced-order model 106 after the parameters 122 have been changed based on the model feedback 128.

After providing offset data to the condition monitor 110 at block 212, and/or providing model feedback 128 to the reduced-order model 106 at block 214, the machine learning model 108 can return to block 202 to receive subsequent sensor data 116 and repeat the process of FIG. 2. The machine learning model 108 can accordingly repeat the process of FIG. 2 continuously as the ECM 104 receives new sensor data 116.

As discussed above, the condition monitor 110 can receive the offset data 124 provided by the machine learning model 108 at block 212. The condition monitor 110 can adjust sensor data 116 received from sensors 114, and/or virtual sensor data 120 provided by the reduced-order model 106, according to the offset data 124. In some examples, if the machine learning model 108 has provided model feedback 128 to the reduced-order model 106 to adjust values of one or more parameters 122, virtual sensor data 120 generated by the reduced-order model 106 may already be at least partially adjusted to reflect previously-determined offset data 124, but the condition monitor 110 may further adjust the virtual sensor data 120 based on any new offset data 124 provided by the machine learning model 108. The condition monitor 110 can use the sensor data 116 and/or virtual sensor data 120, adjusted based on the offset data 124, to determine whether the machine component 112 is currently in a failure condition or is projected to reach a failure condition at a future time, as discussed below with respect to FIG. 3.

Figure 3:
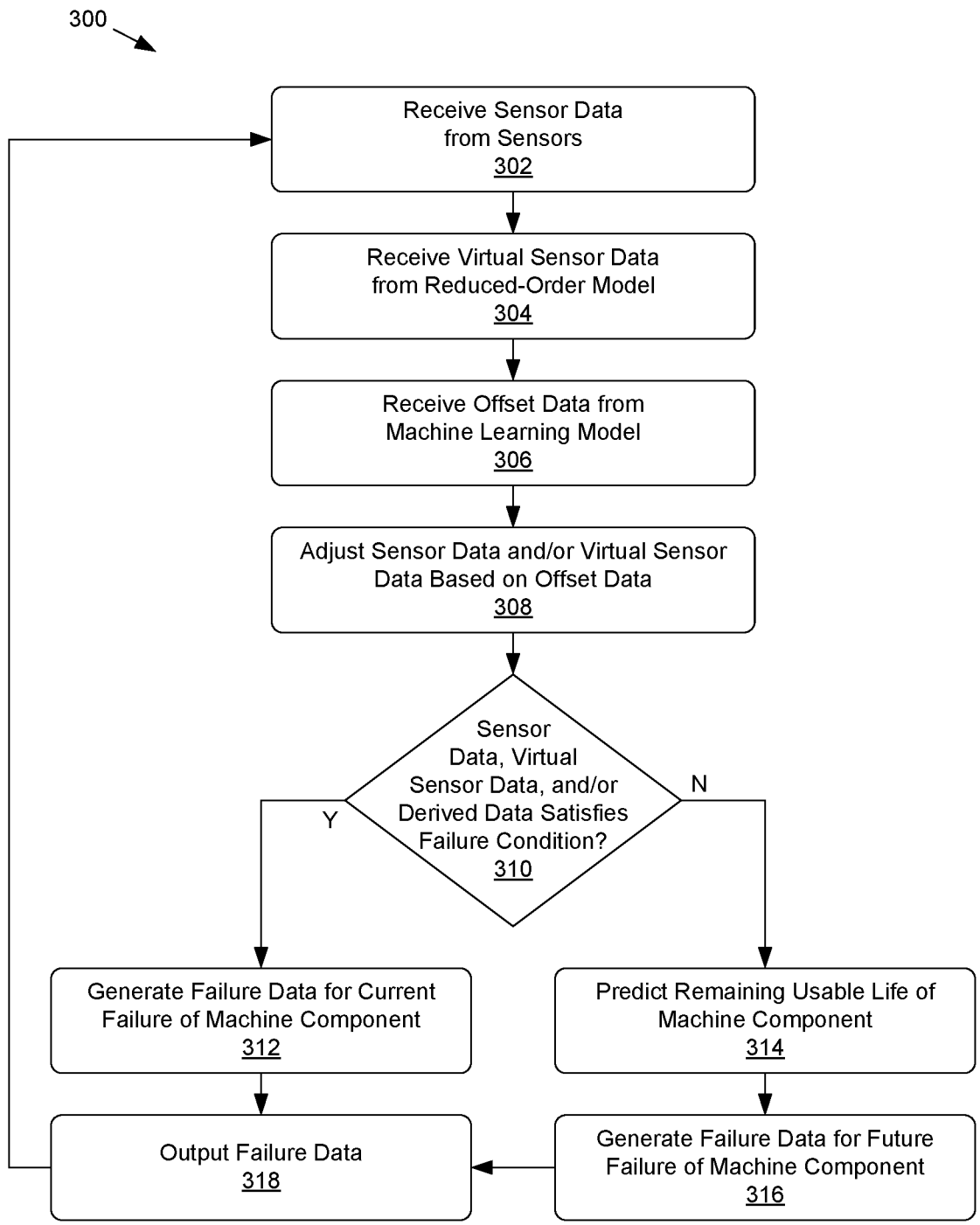
FIG. 3 shows a flowchart illustrating an example process for determining or predicting failures of the machine component.

FIG. 3 shows a flowchart 300 illustrating an example process for determining or predicting failures of the machine component 112. The operations shown in FIG. 3 can be performed by the condition monitor 110 executed by the ECM 104 on-board the machine 102. An example architecture of a computing system associated with the ECM 104 is shown in FIG. 4, and is described below with respect to that figure.

At block 302, the condition monitor 110 can receive sensor data 116 from sensors 114. The sensor data 116 can be associated with the machine component 112 and/or other components of the machine 102. As described above, the sensor data 116 can include vibration data, torque data, speed data, braking commands or other brake data, gear selections, temperature data, solenoid current data, IMU data, strain data, weight data, and/or any other type of data measured or determined by the sensors 114.

At block 304, the condition monitor 110 can receive virtual sensor data 120 generated by the reduced-order model 106 based on the sensor data 116. In some examples, the virtual sensor data 120 can be similar to the sensor data 116 measured by the sensors 114, but be associated with positions on the machine component 112 or other components where the sensors 114 are not physically located. In other examples, the virtual sensor data 120 can include one or more types of sensor data 116 that are inferred or derived from other types of sensor data 116 actually measured or determined by the sensors 114.

At block 306, the condition monitor 110 can receive offset data 124 associated with the sensor data 116 and/or virtual sensor data 120 from the machine learning model 108. The machine learning model 108 can have generated the offset data 124 based on operating conditions of the machine 102 and/or the machine component 112, a current age of the machine component 112, and/or other factors that the reduced-order model 106 may not be configured to consider. The offset data 124 can indicate that values for one or more types of sensor data 116 and/or virtual sensor data 120 should be adjusted up or down based on offset values predicted by the machine learning model using the process shown in FIG. 2.

At block 308, the condition monitor 110 can adjust values in the sensor data 116 and/or virtual sensor data 120 based on the offset data 124 received at block 306. As a non-limiting example, if the offset data 124 indicates that a value for a type of virtual sensor data 120 provided by the reduced-order model 106 should be increased by 10%, the condition monitor 110 can increase that value by 10%.

At block 310, the condition monitor 110 can determine whether values in the sensor data 116, the virtual sensor data 120, and/or data derived from combinations of sensor data 116 and/or the virtual sensor data 120, which may have been adjusted at block 308 according to the offset data 124, satisfy failure condition thresholds 130 of one or more failure conditions. For example, if a failure condition threshold of a failure condition is based on minimum values for vibration data and torque data, and the adjusted sensor data 116 and/or virtual sensor data 120 includes values for vibration data and torque data that exceed the minimum values, the condition monitor 110 can determine that the sensor data 116 and/or virtual sensor data 120 satisfies the failure condition. In some examples, if the failure condition threshold is associated with a threshold period of time, a hysteresis band, or other threshold condition, the condition monitor 110 can determine whether the sensor data 116, the virtual sensor data 120, or corresponding derived data has satisfied the failure condition threshold for at least the threshold period of time, by at least at threshold amount, or otherwise meets the threshold condition associated with the failure condition threshold.

If the condition monitor 110 determines that the sensor data 116 and/or virtual sensor data 120 satisfies a failure condition (Block 310—Yes), the condition monitor 110 can generate failure data 134 indicating that the machine component 112 is likely currently experiencing a failure. The condition monitor 110 can output the failure data 134 at block 318, as discussed further below.

If the condition monitor 110 determines that the sensor data 116 and/or virtual sensor data 120 does not satisfy a failure condition (Block 310—No), the condition monitor 110 can predict a remaining usable life of the machine component 112 at block 314. For example, based on trends of changes to values in the sensor data 116 and/or virtual sensor data 120 over time, the condition monitor 110 can predict that the values in the sensor data 116 and/or virtual sensor data 120 are likely to satisfy a failure condition in a period of days, weeks, months, years, or any other period of time. The condition monitor 110 can accordingly determine that the machine component 112 can continue to be used for a period of time up to a point in time at which the failure condition is predicted to occur. In some examples, the condition monitor 110 can determine the remaining usable life of the machine component 112 as 80%, or another percentage, of the kill period of time until the failure condition is predicted to occur.

At block 316, the condition monitor 110 can generate failure data 134 indicating that the machine component 112 is not currently experiencing a failure, but may be likely to experience a failure at a future point in time. The failure data 134 generated at block 316 can also, or alternately, indicate the remaining usable life of the machine component 112 determined at block 314. The condition monitor 110 can output the failure data 134 at block 318, as discussed further below.

At block 318, the condition monitor 110 can output the failure data 134 generated at block 312 or block 316 to one or more systems of the machine 102. For example, the condition monitor 110 can output the failure data 134 to the on-board display 136 of the machine 102, such that the on-board display 136 can display an alert of a current failure of the machine component 112 or a notification of the remaining usable life or predicted future failure of the machine component 112. As another example, the condition monitor 110 can output the failure data 134 to the communication components 138, such that the communication components 138 can transmit the failure data 134 to the off-board computing device for storage and/or further analysis. As yet another example, the condition monitor 110 can output the failure data 134 to the machine control system 118, such that the machine control system 118 can alter or limit operations of the machine component 112 if the machine component 112 has failed or to prevent the machine component 112 from failing.

As discussed above, the processes shown in FIG. 2 and FIG. 3 can be executed by elements of the ECM 104 on-board the machine 102. Accordingly, the processes shown in FIG. 2 and FIG. 3 can be executed directly on-board the machine 102, without waiting for an off-board computing system to process sensor data 116 and returning failure notifications to the machine 102. An example architecture of a computing system associated with the ECM 104 is shown in FIG. 4, discussed further below.

FIG. 4 shows an example system architecture for a computing system 400 associated with the machine 102. The computing system 400 can be an example of the ECM 104 shown in FIG. 1, or can be configured to execute one or more elements of the ECM 104. For example, the computing system 400 can be configured to execute the reduced-order model 106, the machine learning model 108, and the condition monitor 110. In other examples, the reduced-order model 106, the machine learning model 108, and the condition monitor 110 can be distributed among multiple computing systems. For instance, a first computing system can execute the reduced-order model and the machine learning model 108, while a second computing system executes the condition monitor 110. The computing system 400 can include one or more processors 402, memory 404, and/or communication interfaces 406.

The processor(s) 402 can operate to perform a variety of functions as set forth herein. The processor(s) 402 can include one or more chips, microprocessors, application specific integrated circuits (ASICs), field programmable gate arrays (FPGAs) and/or other programmable circuits, central processing units (CPUs), graphics processing units (GPUs), digital signal processors (PSPs), and/or other processing units or components known in the art. In some examples, the processor(s) 402 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 402 can also access content and computer-executable instructions stored in the memory 404, and execute such computer-executable instructions.

The memory 404 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 402 to perform the operations described herein.

For example, the memory 404 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 402 and/or communication interface(s) 406 during execution thereof by the computing system 400. For example, the processor(s) 402 can possess local memory, which also can store program modules, program data, and/or one or more operating systems.

In some examples, the memory 404 can store data associated with the reduced-order model 106, the machine learning model 108, and/or the condition monitor 110 described above. The memory 404 can also store other modules and data 408 that can be utilized by the computing system 400 to perform or enable performing any action taken by the computing system 400. For example, the other modules and data 408 can include a platform, operating system, and/or applications, as well as data utilized by the platform, operating system, and/or applications.

The communication interfaces 406 can include transceivers, modems, interfaces, antennas, and/or other components that can transmit and/or receive data over networks or other data connections. The communication interfaces 406 can be sensor data interfaces through which the sensors 114 can provide sensor data 116 to the ECM 104. The communication interfaces 406 can also be data interfaces through which the ECM 104 can transmit the failure data 134 to the on-board display 136, the communication components 138, and/or the machine control system 118 of the machine 102. In some examples, the communication interfaces 406 can be the communication components 138 of the machine 102 through which the ECM 104 can transmit failure data 134 to the off-board computing system 140, or the ECM 104 can use the communication interfaces 406 to transmit failure data 134 to the off-board computing system 140 via separate communication components 138 of the machine 102.

INDUSTRIAL APPLICABILITY

As described above, the reduced-order model 106 can be derived from a high-fidelity physics model that is designed to simulate the machine component 112. The reduced-order model 106 can have reduced complexity, relative to the high-fidelity physics model, such that the reduced-order model 106 can be executed by the ECM 104 on-board the machine 102 substantially in real-time. Accordingly, although the ECM 104 may, in some examples, have less processing power and/or other computing resources than an off-board computing system that can simulate the machine component 112 using the high-fidelity physics model, the ECM 104 can use the reduced-order model 106 to generate virtual sensor data 120 that substantially corresponds with data that the high-fidelity physics model would produce.

The reduced-order model 106 can have reduced complexity, relative to the high-fidelity physics model, but may not be directly configured to take certain factors into account that may contribute to failure of the machine component 112. For example, the reduced-order model 106 may not be configured to consider operating conditions of the machine 102, an age of the machine component 112, and/or other changing factors. However, the machine learning model 108 associated with the reduced-order model 106 can be trained to determine offset data 124, associated with the sensor data 116 and/or the virtual sensor data 120 generated by the reduced-order model 106, based on current operating conditions of the machine 102, the current age of the machine component 112, and/or other changing factors that may contribute to failure of the machine component 112. The offset data 124 can be used to adjust the sensor data 116 and/or the virtual sensor data 120 generated by the reduced-order model 106, based on such changing factors, so that the condition monitor 110 can use the adjusted data to more accurately determine a current or predicted failure of the machine component 112.

Additionally, by executing the reduced-order model 106, the machine learning model 108, and the condition monitor 110 on the ECM 104 on-board the machine 102, the ECM 104 can process sensor data 116 to determine whether the machine component 112 has failed, determine a predicted future time at which the machine component will fail, and/or determine a remaining usable life of the machine component 112. Accordingly, the ECM 104 can determine failures of the machine component 112 on-board the machine 102 substantially in real-time, without having to transmit the sensor data 116 to an off-board computing system, wait for the off-board computing system to process the sensor data 116, and wait to determine whether the off-board computing system provides indications that the machine component 112 has failed or will soon fail.

The ECM 104 can also receive and process high-frequency sensor data 116 provided by one or more of the sensors 114. The amount of such high-frequency sensor data may be prohibitive to transmit to an off-board computing system. However, by processing high-frequency sensor data 116 on-board the machine, instead of transmitting a lower-frequency sample of the high-frequency sensor data 116 to an off-board computing system to save on bandwidth usage and limit the amount of transmitted data, the reduced-order model 106, the machine learning model 108, and the condition monitor 110 can have access to more sensor data 116 and/or higher-quality data than an off-board computing system might otherwise receive. Accordingly, by locally processing high-frequency sensor data 116, the ECM 104 may be configured to more accurately detect and/or predict failures of the machine component 112.

Moreover, by using the ECM 104 to detect and/or predict failures of the machine component 112 on-board the machine 102 substantially in real-time, operators of the machine 102 and/or the machine control system 118 can take action more quickly in response to a detected failure or predicted failure of the machine component 112. For example, if the system described herein determines that a driveshaft, axle, U-joint, or other machine component has failed, or is at imminent risk of failing, an operator of the machine 102 can immediately cease operations of the machine 102. If sensor data 116 was instead transmitted off-board to detect or predict failures, operations of the machine 102 might continue, and lead to additional damage, until an off-board computing device processes the sensor data 116 and returns an alert of a detected failure. The failure data 134 generated by the ECM 104, using the reduced-order model 106, the machine learning model 108, and the condition monitor 110, can accordingly prevent damage to the machine component 112, prevent damage to other components of the machine, reduce maintenance time and/or costs, reduce machine downtime, allow maintenance operations to be pre-scheduled, and/or otherwise assist with management and/or maintenance of the machine 102.

Accordingly, overall, the systems described herein can allow a failure of the machine component 112 to be detected and/or predicted more quickly, and more accurately, than other systems. Operations of the machine component 112 can thus be ceased or managed more quickly upon a failure of the machine component 112, and/or preventative maintenance or replacement of the machine component 112 can be scheduled ahead of a predicted failure of the machine component 112.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A method, comprising:
   receiving, by an electronic control module (ECM) on-board a machine, and from one or more sensors on-board the machine, sensor data associated with a machine component of the machine;
   generating, by a reduced-order model executing on the ECM, virtual sensor data corresponding to the sensor data, wherein the reduced-order model is derived from a high-fidelity physics model and is configured to simulate the machine component under static conditions;
   dynamically predicting, by a machine learning model executing on the ECM, offset data based on changing conditions indicated by one or more of:
      an age of the machine component, or
      operating conditions of the machine indicated by the sensor data,
      wherein the offset data indicates adjustments to the virtual sensor data; and
   generating, by a condition monitor executing on the ECM, failure data associated with the machine component by:
      adjusting the virtual sensor data based on the offset data; and
      comparing at least the adjusted virtual sensor data against a failure condition threshold of a failure condition associated with the machine component,
   wherein the failure data indicates at least one of:
      an indication that the machine component has failed, or
      a predicted remaining usable life of the machine component.

2. The method of claim 1, wherein the virtual sensor data is associated with a position on the machine component where none of the one or more sensors is located.

3. The method of claim 1, wherein the virtual sensor data is a type of data derived by the reduced-order model from one or more other types of data indicated in the sensor data.

4. The method of claim 1, further comprising adjusting one or more parameters of the reduced-order model based on the offset data generated by the machine learning model.

5. The method of claim 1, wherein the condition monitor is configured to determine that the machine component has failed by determining that the at least one of the sensor data or the virtual sensor data satisfies the failure condition threshold of the failure condition.

6. The method of claim 1, wherein the condition monitor is configured to determine the predicted remaining usable life of the machine based on predicting a future time at which the at least one of the sensor data or the virtual sensor data will satisfy the failure condition threshold of the failure condition.

7. The method of claim 1, wherein;
   the high-fidelity physics model is a first model of the machine component that is configured to execute on an off-board computing system different from the ECM on-board the machine, and
   the reduced-order model is a second model of the machine component that has reduced complexity relative to the high-fidelity physics model, and is configured to execute via the ECM on-board the machine.

8. The method of claim 1, further comprising outputting the failure data to at least one of:
   an on-board display of the machine,
   an off-board computing system via one or more communication components of the machine, or a machine control system on-board the machine, wherein
the machine control system is configured to adjust
operations of the machine component based on the
failure data.

9. The method of claim 1, wherein generating the failure data comprises:
adjusting the sensor data based on the offset data; and
comparing the sensor data, adjusted based on the offset data, against the failure condition threshold.

10. The method of claim 1, wherein the reduced-order model and the machine learning model are executed, via the ECM on-board the machine, and substantially in real-time within a threshold period of time after receipt of the sensor data, as a digital twin of the machine component.

11. An electronic control module (ECM) on-board machine, comprising:
one or more processors; and
memory storing computer-executable instructions that, when executed by the one or more processors, cause the one or more processors to perform operations comprising:
receiving, from one or more sensors on-board the machine, sensor data associated with a machine component of the machine;
generating, using a reduced-order model, virtual sensor data corresponding to the sensor data, wherein the reduced-order model is derived from a high-fidelity physics model and is configured to simulate the machine component under static conditions;
dynamically predicting, using a machine learning model, offset data based on changing conditions indicated by one or more of:
an age of the machine component, or
operating conditions of the machine indicated by the sensor data,
wherein the offset data indicates adjustments to the virtual sensor data; and
generating failure data associated with the machine component by:
adjusting the virtual sensor data based on the offset data; and
comparing at least the adjusted virtual sensor data against a failure condition threshold of a failure condition associated with the machine component,
wherein the failure data indicates at least one of:
an indication that the machine component has failed, or
a predicted remaining usable life of the machine component.

12. The ECM of claim 11, wherein the operations further comprise adjusting one or more parameters of the reduced-order model based on the offset data generated by the machine learning model.

13. The ECM of claim 11, wherein the operations further comprise outputting the failure data to at least one of:
an on-board display of the machine,
an off-board computing system via one or more communication components of the machine, or
a machine control system of the machine, wherein the machine control system is configured to adjust operations of the machine component based on the failure data.

14. The ECM of claim 11, wherein the ECM is an aftermarket component that is configured to be coupled to the machine and to receive the sensor data.

15. A machine, comprising:
a machine component;
one or more sensors associated with the machine component; and
an electronic control module (ECM) associated with the machine component, wherein the ECM is on-board the machine and is configured to:
receive, from the one or more sensors, sensor data associated with the machine component;
generate, using a reduced-order model, virtual sensor data corresponding to the sensor data, wherein the reduced-order model is derived from a high-fidelity physics model and is configured to simulate the machine component under static conditions;
dynamically predict, using a machine learning model, offset data based on changing conditions indicated by one or more of:
an age of the machine component, or
operating conditions of the machine indicated by the sensor data,
wherein the offset data indicates adjustments to the virtual sensor data; and
generate failure data associated with the machine component by:
adjusting the virtual sensor data based on the offset data; and
comparing at least the adjusted virtual sensor data against a failure condition threshold of a failure condition associated with the machine component,
wherein the failure data indicates at least one of:
an indication that the machine component has failed, or
a predicted remaining usable life of the machine component.

16. The machine of claim 15, wherein the machine component is a driveshaft, an axle, a universal joint (U-joint), an engine component, a transmission component, a hydraulic component, or a component of a work tool of the machine.

17. The machine of claim 15, wherein the ECM is further configured to adjust one or more parameters of the reduced-order model based on the offset data generated by the machine learning model.

18. The machine of claim 15, further comprising an on-board display configured to present a notification or alert associated with the failure data generated by the ECM.

19. The machine of claim 15, further comprising one or more communication components configured to transmit the failure data to an off-board computing system.

20. The machine of claim 15, further comprising:
a machine control system configured to control operations of the machine component,
wherein the machine control system is configured to adjust the operations of the machine component based on the failure data.

* * * * *